United States Patent [19]
Canavan

[11] 3,783,958
[45] Jan. 8, 1974

[54] OFF-ROAD VEHICLE

[76] Inventor: Thomas E. Canavan, 326 S. Webber Dr., Chittenango, N.Y. 13037

[22] Filed: May 10, 1972

[21] Appl. No.: 252,102

[52] U.S. Cl.............. 180/5 R, 180/9.24 A, 305/27
[51] Int. Cl.. B62m 27/02, B62d 55/02, B62d 55/10
[58] Field of Search................ 180/9.24, 9.26, 6.54, 180/5 R; 305/24, 27, 28, 34

[56] References Cited
UNITED STATES PATENTS

| | | | |
|---|---|---|---|
| 3,726,355 | 4/1973 | Dunder | 180/5 R |
| 3,358,634 | 12/1967 | Pratt | 305/34 |
| 1,598,778 | 9/1926 | Leake | 305/27 |
| 3,709,312 | 1/1973 | McGough | 180/5 R |
| 1,336,961 | 4/1920 | Holt | 305/27 |
| 1,178,552 | 4/1916 | Strait | 305/28 |
| 1,186,785 | 6/1916 | Holt | 305/28 |

Primary Examiner—Richard J. Johnson
Assistant Examiner—Reinhard J. Eisenzopf
Attorney—Edgar H. Kent

[57] ABSTRACT

An off-road vehicle comprising an endless track for driving the vhicle, front and rear rotary members mounted for rotation upon a fixed frame, the track being trained about the rotary members to define a closed loop having upper and lower lengths of track with respect to those rotary members, and pairs of load-bearing wheels rotatably mounted upon a second frame disposed within the loop, the wheels engaging inside the lower length of track in load-supporting relation to the fixed frame. Connecting means are provided which connect the second frame to the fixed frame, the connecting means including positioning means operative to maintain a first end pair of wheels at a greater distance from the fixed frame than the other end pair of wheels, the second frame and positioning means being movable with respect to the fixed frame to an orientation in which the first end pair of wheels is at a lesser distance from the fixed frame than the other end pair of wheels for adjusting the position of the lower track run relative to the terrain.

6 Claims, 5 Drawing Figures

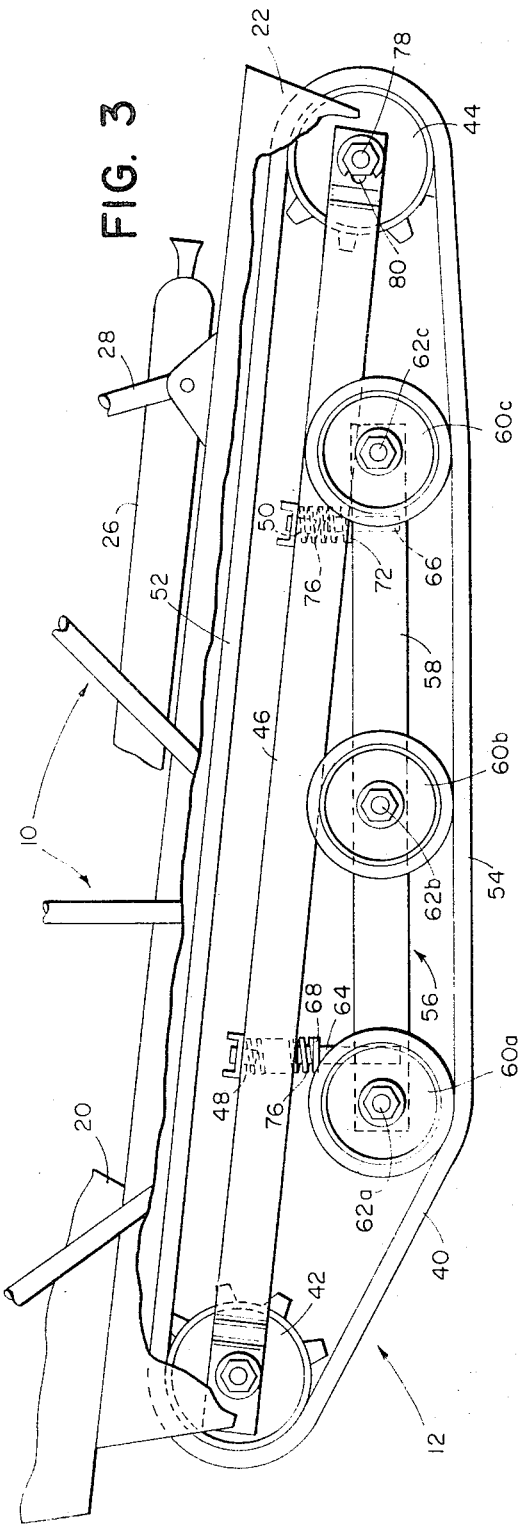
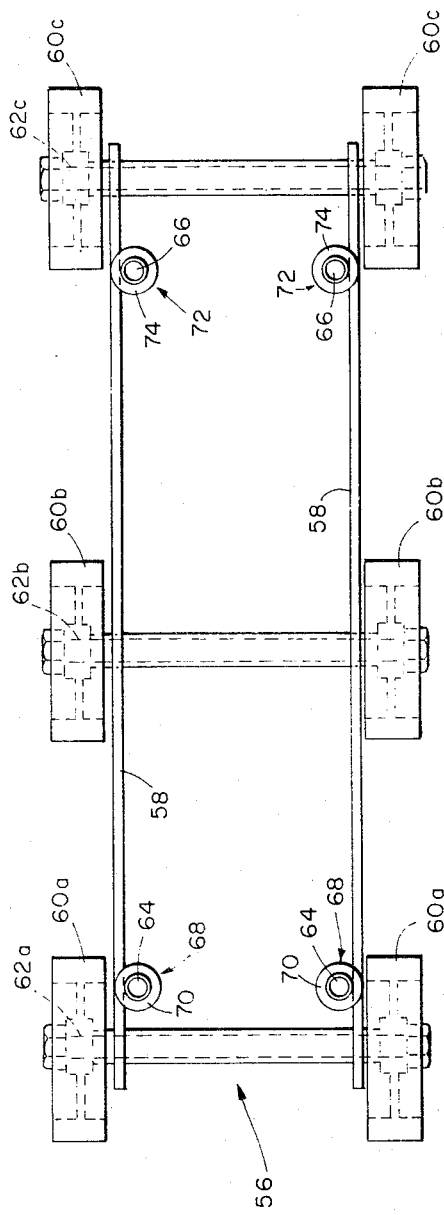

3,783,958

1

OFF-ROAD VEHICLE

BACKGROUND OF THE INVENTION

This invention relates to off-road vehicles, and more particularly to vehicles suitable for travel on either snow or dirt surfaces.

As is well known, it is highly desirable for a tracked vehicle to have a large area of contact with the terrain when traveling on snow, but to have a small area of contact (e.g., approaching the tangential contact of an actual wheel) when traveling on dirt. Accordingly, it is a principal object of the present invention to provide a vehicle suitable for travel on either snow or dirt with an adjustable track arrangement whereby convenient and reliable changes in the track orientation with respect to the underlying terrain may be achieved.

SUMMARY OF THE INVENTION

Thus, the invention features improvements in an off-road vehicle comprising an endless drive track which is trained about rotary members which are mounted for rotation upon a fixed frame. The track defines a closed loop having upper and lower lengths of track with respect to those rotary members. Also provided are a plurality of load-bearing wheels rotatably mounted upon a second frame which is a bogie frame disposed within the loop. The wheels engage the lower length of track and are in load-supporting relation with the fixed frame. The improvement comprises the provision of means which removably connect the second frame to the fixed frame to permit the removal of the second frame from the loop of track. Those means are operative to maintain at least one of the load-bearing wheels at a greater distance from the fixed frame than another of the wheels. In preferred embodiments, those means comprise at least four spiral springs disposed under compressive force between the fixed and bogie frames; two of those springs rest upon support surfaces adjacent one end of the bogie frame and the other two rest upon support surfaces adjacent the other end of the bogie frame; and the support surfaces at one end of the bogie frame are disposed at a different distance from a reference plane defined by the axes of the opposite end bogie wheels than are the other support surfaces. With this preferred arrangement the configuration of the loop of track may be altered by removal of the bogie frame and reinsertion thereof within the loop in a different orientation with respect to the fixed frame and to the terrain.

In preferred embodiments the support surfaces comprise upwardly facing flanges rigidly secured to the bogie frame, each flange supporting a compression spring which itself supports the fixed frame.

Other objects, features, and advantages of the invention will appear from the following description of particular preferred embodiments which are shown in the drawings. In the drawings:

BRIEF DESCRIPTION OF THE DRAWINGS

FIG. 3 is a partially broken away side elevation of the track assembly of the vehicle of FIG. 1;

FIG. 4 is a top plan view of a removable subunit of the track assembly of FIG. 3; and

2

Figure 5:
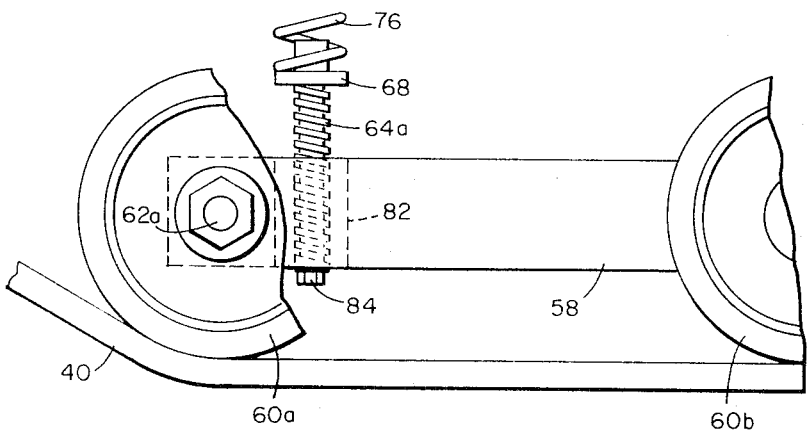

FIG. 5 is a greatly enlarged view of an alternative embodiment of a portion of the track assembly of FIG. 3.

DESCRIPTION OF THE PREFERRED EMBODIMENT

Figure 1:
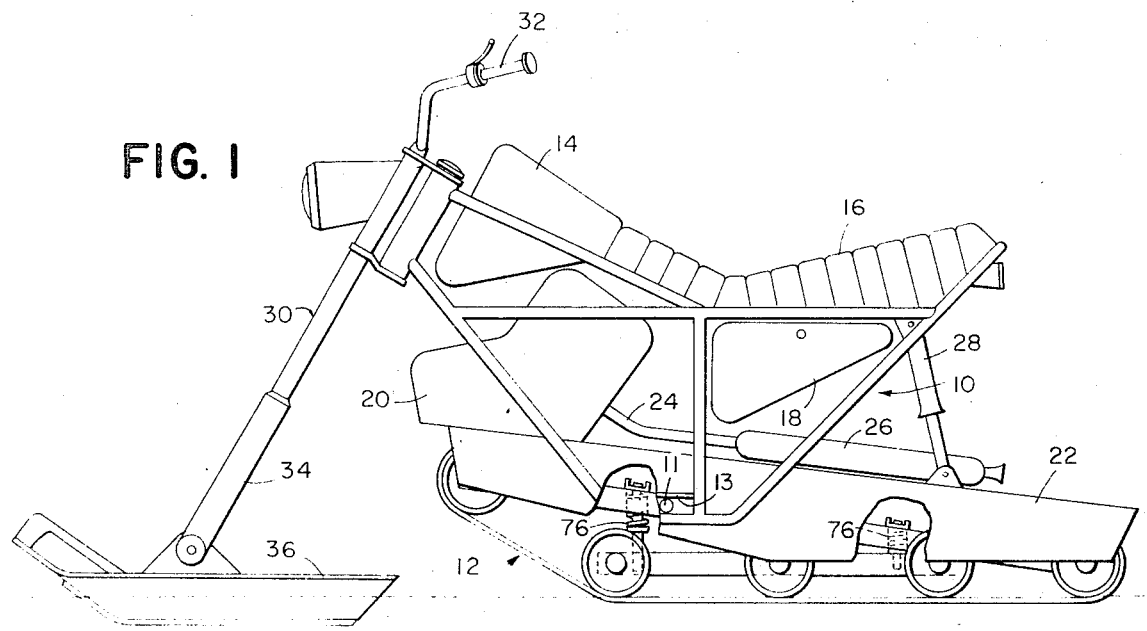
FIG. 1 is a side elevation of a vehicle constructed according to the invention as set up for travel on snow.
Figure 2:
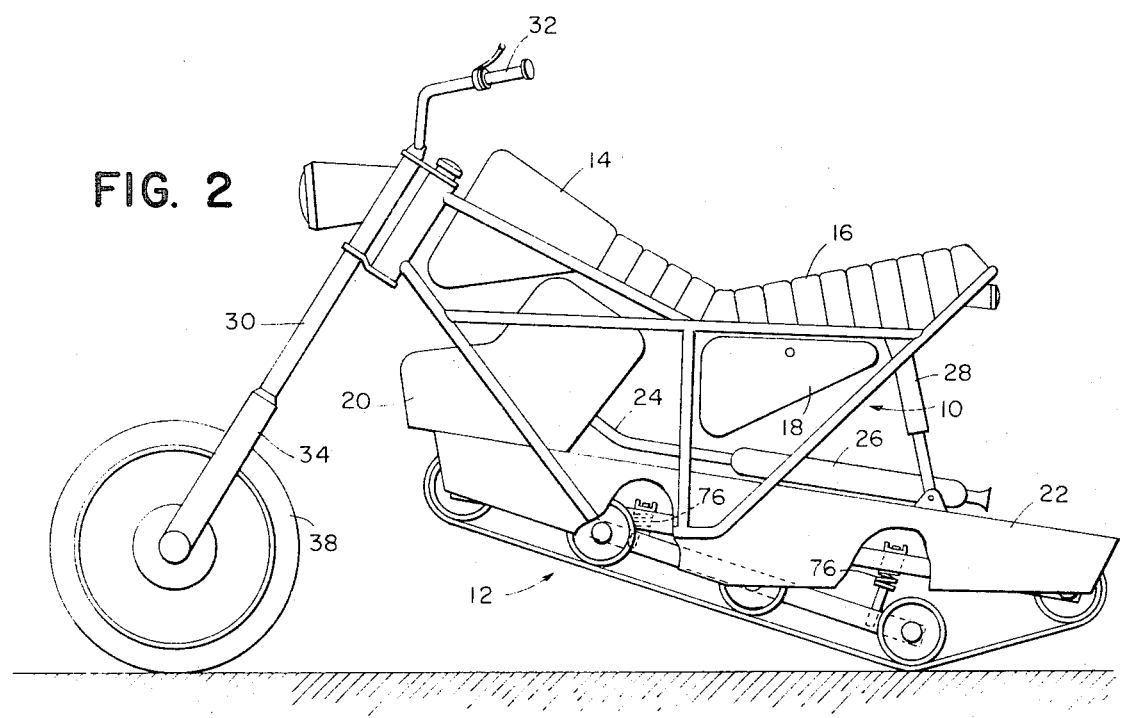
FIG. 2 is a side elevation of the vehicle of FIG. 1 as altered for travel on dirt.

Referring to FIGS. 1 and 2, the vehicle comprises a tubular frame 10 which is pivotally secured at 11 (FIG. 1) to a track assembly 12. Foot rest 13 is integral with frame 10. A fuel tank 14 and seat 16 are mounted on the upper portion of frame 10, and a battery compartment 18 is mounted beneath the seat 16. Engine 20 is secured to both frame 10 and protective cover or pan 22 which is mounted over the track assembly 12. A fuel line (not shown) leads from fuel tank 14 to engine 20. Exhaust manifold 24 is provided between engine 20 and muffler 26. A pair of shock absorbers 28 (only one being visible in the side elevations of FIGS. 1 and 2) are pivotally mounted upon pan 22 and the rear portion of frame 10. Steering column 30 is rotatably mounted at the front portion of frame 10 and has upwardly projecting steering handle 32 rigidly secured thereto. Shock absorber 34 extends between steering column 30 and the element which actually engages the terrain and removably connects that element to steering column 30. In the vehicle configuration of FIG. 1 that element is ski 36 and in the configuration of FIG. 2 that element is a wheel 38, preferably 18 inch O.D. having a three-inch wide "trail pattern" tread.

The track assembly 12 is best seen in FIGS. 3 and 4. Track 40 (nominally 10 inches wide and 108 inches overall length), preferably comprising a series of full width track elements each pivotally interconnected with its neighbors, is trained about front drive sprockets 42 and rear idler sprockets 44. Each set of sprockets is rotatably mounted upon a frame 46 which is secured to pan 22 by a multiplicity of screws (not shown). Fixed, downwardly-facing front and rear pairs of studs, 48 and 50, respectively, are rigidly secured to the frame 46.

The track 40 is connected in an endless loop having an upper length of track 52 above sprockets 42, 44 and a lower length of track 54 below sprockets 42, 44. A bogie tree 56 is provided between the lower length of track 54 and the frame 46. The bogie tree 56 comprises a frame 58, six bogie wheels 60 mounted in pairs identified as 60a, 60b and 60c which are rotatable about axles 62a, 62b and 62c, respectively, mounted upon frame 58. In the preferred form illustrated, the distance between the axes of axles 62a and 62b is 11 inches and the distance between the axes of axles 62b and 62c is 13 inches. Posts 64 are rigidly secured to frame 58 (e.g., as by welding) at locations intermediate axles 62a and 62b, preferably spaced 1 ¾ inches from the axis of axle 62a. Posts 66 are similarly mounted and oriented between axles 62b and 62c, preferably 2 ½ inches from the axis of axle 62c. The posts 64 extend above the top surface of frame 58 preferably for a distance of 2 ⅛ inches and have a flange 68 rigidly secured to the post (e.g., as by welding) preferably ⅝ inch below the top of the post. Flanges 68 include upwardly facing surfaces 70 which act, as further described below, as support surfaces. The posts 66 have flanges 72 secured thereto substantially at the level of the upper surface of frame 58 with the post preferably extending ⅝ inch above that level. Flanges 72 have upwardly facing support surfaces 74. Spiral compression springs 76 rest on each of surfaces 70, 74 and engage fixed frame 46 at their other ends. The portions of posts 64, 66 which extend above flanges 68, 72 project into the hollow center of the springs 76 as do, at the other ends of the springs, studs 48 and 50. In the preferred embodiment described the springs preferably have an unloaded height of 3 ½ inches, an outside diameter of 1 ¼ inch, an inside diameter of ⅝ inch and a compression 0.1 inch per 35 lbs. of force.

The rear sprockets 44 are mounted upon an axle 78 which extends through openings 80 in the frame 46. The openings 80 are elongated in a front-to-back direction and the axle 78 is secured at a particular location within the opening 80 by means of a lock nut (not shown).

In operation, the front sprockets 42 are driven in a conventional fashion by the engine 20 and in turn drive the track 40. The bogie tree 56 is disposed between the lower length of track 54 and the frame 46 which supports sprockets 42, 44, the bogie wheels engaging the upper surface of the lower length of track 54. The fixed frame 46 (and thus the tubular frame 10 and the rider of the vehicle) is supported by the lower length of track 54 through the bogie tree 56 and the springs 76. The springs 76, and studs 48, 50 and the portions of posts 64, 66 which extend into the springs, serve to maintain the bogie tree in correct lateral alignment with respect to the lower length of track 54. In the configuration best seen in FIG. 3, the bogie tree is disposed with posts 64 toward the front of the vehicle and posts 66 toward the rear of the vehicle. Since the surfaces 70 are further above a reference line drawn through the axes of axles 62a, 62c than are surfaces 74, the front portion of bogie frame 58 will, for a given compression or springs 76, be further from the frontwardly upwardly sloping fixed frame 46 than will be the rear portions of the frame 58. This provides for a generally horizontal disposition of the bogie tree 56 and the consequent generally horizontal disposition of a large segment of the lower length of track 54 as shown in FIG. 1. Such a configuration of the track is ideal for travel of the vehicle over snow. With the track specifications given above and the bogie tree arrangement shown in FIG. 3, the track area in contact with the snow will be approximately 420 sq. inches.

To convert the vehicle for travel over a dirt surface, in addition to replacing the ski 36 with wheel 38, the track orientation with respect to the underlying terrain is altered to provide for a very small area of contact between the track and the terrain, which area is located beneath the rear portion of the vehicle. This change in track configuration is simply achieved by loosening the axle 78 and allowing it to slide forward in the opening 80 on fixed frame 46, thereby producing slack in the track 40. This slack relieves all force on the springs 76 allowing the springs to be slipped by studs 48, 50 and then removed entirely from the track assembly 12. The bogie tree 56 is removed entirely from the track assembly 12 by sliding it sideways out of the track loop. The bogie tree is then reversed 180° about a vertical axis and reinserted into its position between fixed frame 46 and lower length of track 54. In this orientation the support surfaces 74 are aligned with studs 48 toward the front of the track assembly 12, and the support surfaces 70 are aligned with studs 50 toward the rear of track assembly 12. The springs 76 are then reinserted between aligned pairs of studs 48, 50 and posts 66, 64 and the axle 78 returned to its former (rearmost) location within opening 80 and again secured at that location. With the track 40 thus properly tensioned, the vehicle will appear as shown in FIG. 2. Because the lower flanges 72 are now located beneath studs 48 the same degree of compression of springs 76 will result in the now frontmost portions of bogie frame 58 being much more closely spaced to the fixed frame 46 than in the former arrangement of the bogie tree and, similarly, with the uppermost flanges 68 aligned with studs 50 the now rearmost portions of the frame 58 will be spaced farther from fixed frame 46 than in the former orientation of the bogie tree. The resultant is a track assembly configuration as shown in FIG. 2 wherein the lower length of track 54 contacts the terrain only adjacent the rearmost bogie wheels and slopes upwardly away from the terrain between those bogie wheels and both drive sprockets 42 and 44.

It will be appreciated that with the foregoing construction for a vehicle to be used on both snow and dirt terrains, the required change in track configuration may be simply and efficiently achieved by the simple reversal of a rugged mechanical unit (i.e., the bogie tree) without the necessity of extra (otherwise unnecessary) moving parts, fluid lines and cylinders (which are prone to failure), etc.

It will be appreciated that orientation changes of the frame 58 other than 180° reversal about a vertical axis are suitable with slight modifications thereof. (E.g., with the addition of downwardly directed posts (a) identical to posts 64 and axially aligned with posts 66, and (b) identical to posts 66 and axially aligned with posts 64, as well as the use of somewhat larger diameter bogie wheels 60a, b, c, inversion of the bogie frame would achieve the change in track configuration between FIGS. 1 and 2.)

Furthermore, it is possible to achieve the desired change of track loop configuration without removing the frame 58 from the loop by providing for in-place adjustments in the connecting and/or positioning means which extend between frames 46 and 58. For example, as shown in FIG. 5, either the front posts 64a or all posts may be themselves threaded and each supported in an internally threaded housing 82 fixed to frame 58. Thus, by rotation of posts 64a (as with a ratchet wrench (not shown) engageable with hex nuts 84 integral with posts 64a) to lower the flanges 68, and the similar raising of the rear flanges 72, the desired reversal of the spacings of the front and rear pairs of wheels 60a, 60c from fixed frame 46 may be achieved. (If the rear flanges 72 are at an intermediate height above frame 58 and front flanges 68 are adjustable between quite high and quite low positions, adjustability of the front flanges only can suffice.) Conventional sliding-rail type bogie trees may also be employed in the track assembly 12. As is well known, such bogie trees have a single pair of wheels (i.e., corresponding to wheels 60c of FIG. 3) and a pair of rails fastened to the frame forward of the wheels. Each rail is aligned with a wheel and extends from substantially the front end of the frame to a location somewhat forward of the wheel. The rails bear upon the inside of the lower length of track 54 and thus replace, in function, wheels 60a and 60b.

While particular preferred embodiments have been described in detail, other embodiments are within the scope of the invention and the following claims.

What is claimed is:

1. An off-road vehicle comprising a terrain-contacting steerable support unit and a longitudinally spaced drive unit, said drive unit comprising an endless track for driving the vehicle, front and rear rotary members mounted for rotation upon a longitudinally extending fixed frame, said track being trained about said rotary members to define a closed loop having upper and lower lengths of track with respect to said rotary members and at least one pair of load-bearing members mounted upon a second longitudinally extending frame disposed within said loop, said members engaging inside said lower length of track in load-supporting relation to said fixed frame, connecting means being provided which connect said second frame to said fixed frame, said connecting means including positioning means operative to adjust said second frame with respect to said fixed frame to an orientation in which a major portion of the lower length of track opposite said load-bearing members is in contact with the terrain for operation of the vehicle on snow, or to a second orientation in which a minor portion of said lower length of track is in contact with the terrain for operation of the vehicle on dirt.

2. The invention as claimed in claim 7 wherein said connecting means comprise springs disposed under compressive force between the fixed and second frames.

3. The invention as claimed in claim 2 wherein there are provided at least two of said springs generally aligned with each end of said second frame, each said spring being a spiral spring.

4. The invention as claimed in claim 3 wherein said load-bearing members comprise pairs of front and rear wheels, said second frame including a pair each of front and rear support surfaces, one said spring resting on each said support surface, each of one of said pairs of support surfaces being disposed further from a reference plane defined by the axes of said front and rear of said pairs of wheels than each of the other of said pairs of support surfaces, said springs being substantially identical.

5. The invention as claimed in claim 4 wherein each said support surface comprises a surface of a flange rigidly secured to a post attached to said second frame.

6. The invention as claimed in claim 5 wherein said connecting means removably connect said second frame to said fixed frame to permit removal of said second frame from said loop and repositioning the same relative to the fixed frame in said loop.

* * * * *

UNITED STATES PATENT OFFICE
CERTIFICATE OF CORRECTION

Patent No. 3,783,958      Dated January 8, 1974

Inventor(s) Thomas E. Canavan

It is certified that error appears in the above-identified patent and that said Letters Patent are hereby corrected as shown below:

Abstract, line 2, change "vhicle" to --vehicle--.

Col. 3, line 33, change "or" to --of--.

Col. 5, claim 2, line 1, change "7" to --1--.

Signed and sealed this 23rd day of April 1974.

(SEAL)
Attest:

EDWARD M. FLETCHER, JR.
Attesting Officer

C. MARSHALL DANN
Commissioner of Patents